March 10, 1970  C. E. LAND ET AL  3,499,704
FERROELECTRIC CERAMIC ELECTRO-OPTICAL DEVICE
Filed Sept. 14, 1967

Cecil E. Land
Ira D. McKinney
INVENTORS

United States Patent Office 3,499,704
Patented Mar. 10, 1970

3,499,704
FERROELECTRIC CERAMIC ELECTRO-OPTICAL DEVICE
Cecil E. Land and Ira D. McKinney, Albuquerque, N. Mex., assignors to the United States of America as represented by the United States Atomic Energy Commission
Filed Sept. 14, 1967, Ser. No. 668,307
Int. Cl. G02f 3/00
U.S. Cl. 350—160                    10 Claims

ABSTRACT OF THE DISCLOSURE

An electro-optical device or apparatus comprising a hot-pressed, optically uniaxial ferroelectric ceramic plate, electrodes disposed at major surfaces of the ceramic plate for selectively polarizing the plate parallel or perpendicular to surfaces of the plate to align the ferroelectric domains along their crystallographic axes in the direction of polarization and thus vary the capacity of the plate, a light source disposed adjacent one side of the plate and means responsive to the level of light transmitted through the plate.

BACKGROUND OF THE INVENTION

There are many applications in the optical and electrical arts for a device in which the optical properties can be rapidly changed or switched such as with an electrical signal from a condition of transparency to a condition of opacity and vice versa. Such applications include light shutters or switches, optical displays and computer logic, memory and storage systems.

Various prior electro-optical systems, that is systems where the optical properties of a material may be varied by an electrical signal, have used the polarization of ferroelectric domains to affect transmission of polarized light through a single crystal ferroelectric plate. The difference in light transmissivity may be due to the difference in birefringence of c-domains and a-domains in crystal plates where a particular crystalline axis is aligned perpendicular to the major surfaces of the plate. With the c or a crystalline axes oriented in a given direction, perpendicular switching or orientation of the optic axes by 90° at a localized position or location changes the birefringence of the plate at that location. If the crystal is positioned between crossed polarizers, the change in birefringence may result in a corresponding change in transmittance of polarized light through the polarizer-crystal-polarizer combination. The width of the transition region between the locally switched area and the surrounding unswitched area or fringe in single crystals may be of the order of the crystal thickness. In single crystals, perpendicularly switched domains are opposed by high localized strain fields, and therefore, decay fairly rapidly. The decay time of localized a-domains in a c-domain crystal may be of the order of a microsecond or less, while for c-domains in an a-domain crystal, the decay time may be of the order of minutes or hours.

In these systems, the difference in light transmittance was conventionally sensed by polarizing in a given direction the light ray incident to the ferroelectric crystal and measuring the amount of light passing through the crystal and a polarization analyzer having a direction of acceptance perpendicular to the polarizer and positioned to receive the light ray propagated through the crystal. In order to achieve the maximum difference in light transmission for different crystal polarizations, the polarizer and analyzer required precise alignment.

Further, depending on the particular ferroelectric material used, the crystal had to be maintained within particular temperature ranges related to the material's Curie temperature in order to exhibit the desired electro-optical effect.

SUMMARY OF INVENTION

In view of the limitations of the prior art as noted above, it is an object of this invention to provide a ferroelectric electro-optical device wherein the transmittance changes are visible under ordinary light.

It is a further object of this invention to provide a ferroelectric electro-optical device in which the perpendicularly switched domains do not normally relax back to their original orientation.

It is a further object of this invention to provide a ferroelectric electro-optical device wherein the fringe width surrounding a locally switched area is independent of and may be less than the thickness of the ferroelectric material.

It is a further object of this invention to provide a ferroelectric electro-optical device which may be operated at room temperature.

Various other objects and advantages will appear from the following description of one embodiment of the invention, and the most novel features will be particularly pointed out hereinafter in connection with the appended claims.

The invention comprises a thin, optically uniaxial ferroelectric ceramic plate or layer, means for selectively varying light-level-transmitting properties by polarizing the plate parallel or perpendicular to the major surfaces of the plate at selected locations thereof, means for passing ordinary light through the plate and means for sensing the level of light transmitted through and perpendicular to the plate at said locations.

DESCRIPTION OF DRAWINGS

The present invention is disclosed in the accompanying drawings wherein.

FIG. 4 is a schematic view of a power supply and switching circuit for the device of FIG. 1 and the electrode configuration of FIG. 3a;

DETAILED DESCRIPTION

Figure 1:
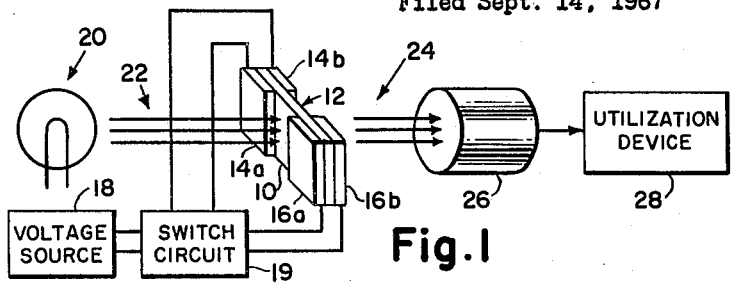
FIG. 1 is a diagrammatic view of an electro-optical device including an optically uniaxial ferroelectric ceramic element.

FIG. 1 illustrates one embodiment of an electro-optical device or apparatus which utilizes the principles of this invention. In the device shown in FIG. 1, a hot pressed, optically uniaxial, ferroelectric ceramic or polycrystal member or plate 10 includes a first end portion having electrodes 14a and 14b disposed at opposing major surfaces of the plate, a central exposed portion 12, and a second end portion having electrodes 16a and 16b also disposed at the opposing major surfaces. Ceramic plate 10 and the electrodes are shown for purposes of illustration with exaggerated cross-sectional dimensions. Ceramic plate 10 may be a thin polished plate about 10 mils or less in thickness while the electrode may be suitable vapor deposited, conductive, thin films of any convenient thickness. Electrodes 14a, 14b, 16a and 16b may be connected to a suitable voltage source 18 through a switch circuit 19 as will be described more fully with regards to FIGS. 3a and 4.

A suitable light source 20, such as an incandescent lamp which may include a conventional lens or fiber optics system to collimate the light rays from source 20, may be positioned adjacent ceramic plate 10 so that light rays 22 impinge on the exposed central portion 12 of a major surface of the plate. Any light, such as light rays 24, which is transmitted through ceramic plate 10 may be sensed by photosensitive device 26 which generates a signal proportional to the amplitude of light rays 24 for use by utilization device 28. Photosensitive device 26 may be a conventional photomultiplier tube or photodiode which is sensitive to ordinary light.

Plate 10 may be a thin, polished plate made of hot-pressed, homogeneous, optically uniaxial ferroelectric ceramic. Such a ceramic plate is made up of a multiplicity of individual crystallites or grains in which each crystallite includes an electrical polar or optic axis along a particular crystallographic direction and an isotopic optical plane perpendicular thereto. The ceramic plate is normally translucent or nearly opaque in the virgin or thermally depoled state since the optic axes are randomly oriented, and hence the ferroelectric domains, and the random orientation of the domains produce considerable scattering and diffusion of transmitted light and complete depolarization of polarized light.

Ceramic plate 10 may be any hot-pressed, optically uniaxial, ferroelectric ceramic, such as barium titanate, Rochelle salt, or lead zirconate-lead titanate, having a grain size of at least 2 microns or more and a high degree of homogeneity. A typical ferroelectric ceramic may be the lead zirconate-lead titanate solid solution having a $PbZrO_3$ to $PbTiO_3$ mol percent ratio of about 65 to 35 and containing about 2 atom percent bismuth oxide. The lead birconate-lead titanate may be prepared in the following manner: (1) weighing the chemical oxide powders, (2) wet mixing in a suitable liquid medium, (3) drying, (4) calcining at a temperature of about 800° C. for about 1 hour, (5) granulation or wet milling of the calcine to break down the partially sintered particle aggregates, (6) drying, (7) cold pressing of the powder into a slug and then (8) hot pressing at a temperature from about 1100° C. to about 1400° C. for from about 0.5 to 16 hours at a pressure from about 1000 to about 10,000 p.s.i. The grain size may be controlled by the proper choice of chemical modifiers which enhance the desirable electrical properties yet inhibit grain growth (such as $Bi_2O_3$ or $Nb_2O$), by the selection of raw material oxide powders which are of sufficient chemical purity (generally greater than about 99.2%) and by the proper selection of the hot pressing conditions of temperature, time and pressure. After hot pressing, the slug may be sliced into thin wafers which may then be lapped to the desired thickness and polished. The resulting plate may then be annealed at about 500 to 700° C. for about 15 minutes, cooled to room temperature, electrodes positioned or plated on, and the plate electrically polarized to the desired uniform initial polarization. The material exhibits the desired electro-optical properties at room temperatures.

Figure 2A:
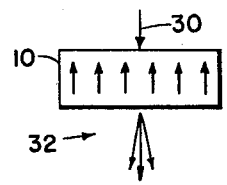
FIGS. 2a and 2b are diagrammatic views along a cross section of ferroelectric ceramic elements each initially polarized perpendicular and parallel respectively to the major surfaces of the elements.

An initial uniform switching field may be applied between or parallel to the major surfaces of the ceramic plate by suitable electrode and voltage source means (not shown) in a well known manner. With an initial uniform switching field applied between or perpendicular to the major surfaces of the ceramic plate, such as plate 10 in FIG. 2a, the optic axes of the crystallites or domains may be oriented or aligned in the crystallographic direction with exaggerated cross-sectional dimensions within the individual grains in the direction of the arrows as shown. With this orientation ceramic plate 10 becomes transparent (with transmittance as high as 0.9). It has been found that collimated light, such as light ray 30, generally perpendicular to the major surface of the plate may be transmitted through the plate and scattered in a light ray pattern 32 having an angle of about 10 degrees to a normal to the major surfaces of plate 10. The light intensity difference between the forward scattered light at the normal and light at 10 degrees therefrom is on the order of 10 to 1. Scattering curve 33 in FIG. 3c shows the angular distribution of the transmitted light relative intensities.

Figure 2B:
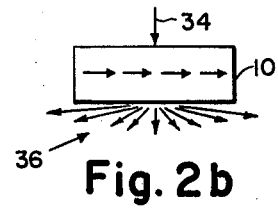
Figure 2C:
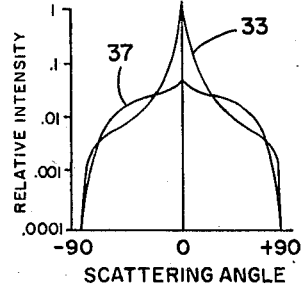
FIG. 2c is a graph showing the transmitted light scattering patterns for the ceramic elements shown in FIGS. 2a and 2b.

With an initial uniform switching field applied parallel to the major surfaces of ceramic plate 10, the optic axes of the crystallites or domains may be oriented in the direction of the arrows as shown in FIG. 2b. With this orientation of optic axes, ceramic plate 10 is opaque due to the multiple scattering. It has been found that collimated light such as light ray 34 may be scattered through plate 10 as shown by light rays 36 with a scattering pattern similar to that shown by curve 37 in FIG. 2c. A typical ratio of transmitted light intensities at a scattering angle of 0° for the two electrical polarized conditions is approximately 30 to 1 as shown in FIG. 2c by patterns 33 and 37. It has also been found that a hot pressed ferroelectric ceramic plate may be switched by an electric field generally perpendicular to the uniform initial polarization at a localized position or area. A localized field applied generally perpendicular to the initial polarization produces, on the average, 90° switching of domains. The width of the fringe (i.e., the width of the transition region between the locally switched area and the surrounding unswitched area) surrounding perpendicularly switched domains in the ceramic plate is a function of grain size, generally between five and ten nominal grain diameters. Hence, for 5 micron grain diameter material, the fringe width may be between 25 and 50 microns.

Since the fringe width is dependent on grain size, the desired fringe width, which may depend upon the particular application of the device, may be achieved by selecting the appropriate hot pressing parameters. For instance, in order to effect a grain size of about 5 microns, the hot press slug may be hot pressed at a temperature of about 1300° C. for about 1 hour at about 3000 p.s.i.

In a hot pressed ferroelectric ceramic plate having an initial uniform polarization, domains switched by a localized perpendicular field may be opposed by strain fields which are small compared to those in a single crystal due to the nonuniformity of domain orientation after switching due to the polycrystalline structure of the material. Therefore, the switched area does not tend to relax back into the original domain orientation, but remains until an appropriate switching field is applied to return it to its initial domain orientation.

The effect on optical transmittance of the ceramic plate is that the localized switched area is rendered either opaque or transparent to ordinary incident light depending on the initial uniform polarization of the plate. Thus, a ceramic plate, such as plate 10 in FIG. 2a, which has been initially uniformly polarized perpendicular to the major surfaces of the plate and is transparent to ordinary light and which has been perpendicularly switched parallel to the major surfaces at a localized position or area may be opaque to ordinary light over the switched area.

Figures 3A, 3B:
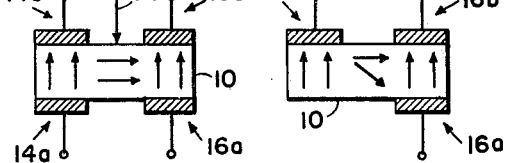
FIGS. 3a, 3b and 3c are diagrammatic views showing alternative electrode configurations and the domain orientations after switching along a cross section with a ferroelectric ceramic element initially polarized perpendicular to the major surfaces of the element.
Figure 3C:
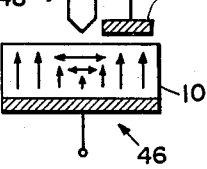
Figure 4:
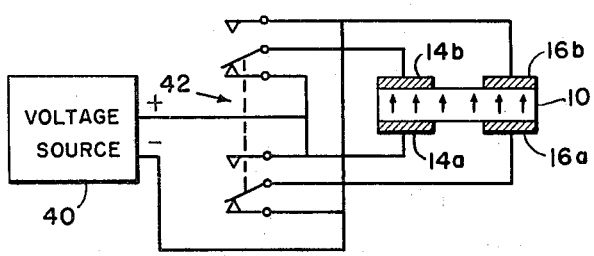

FIGS. 3a, 3b and 3c illustrate three methods of producing domain switching by a localized perpendicular field in ceramic plates initially, uniformly poled normal to their major surfaces. The method shown in FIG. 3a utilizes the same general electrode configuration illustrated in FIG. 1. Electrodes 14a and 14b may be connected to the positive terminal of a suitable direct current voltage 40, as shown in FIG. 4, through a conventional electronic or mechanical switching arrangement such as double pole, double throw switch 42. Electrodes 16a and 16b may be connected in turn to the negative terminal of voltage source 40 through switch 42. The electric field generated by this electrode configuration and electrode biasing provides a localized perpendicularly switched domain polarization or bits of information as shown by the arrows. A beam of ordinary light 44 impinging on ceramic plate 10 at this localized area may be multiple scattered as shown in FIGS. 2b and 2c and thus appear to be opaque to a suitably positioned light sensitive device. Ceramic plate 10 may be switched back to its initial uniform polarization or the bit erased by reversing switch 42 so that electrodes 14a and 16a are connected to the positive terminal of voltage source 40 and electrodes 14b and 16b are connected to the negative terminal thereof. In order to provide complete bit erasure and ideal field distribution it is desirable that the spacing between electrodes on each surface of plate 10 be less than or equal to the thickness of the ceramic plate.

The electrode configuration shown in FIG. 3b may be a variation of the configuration shown in FIGS. 3a and 4 by eliminating electrode 14a. The resulting localized polarization may not produce as great a level of multiple scattering as that of FIG. 3a since the polarization may not be as uniform due to the different field distribution as shown by the arrows.

In FIG. 3c, a major surface of ceramic plate 10 may be plated or covered with a thin conductive film to form an electrode 46 over the entire surface of the plate. A suitable stylus or other appropriate point electrode 48 may be positioned adjacent the other major surface of ceramic plate 10 as shown. It may be desirable in some applications that electrode 48 be adapted to move along ceramic plate 10 so as to enable the application of localized perpendicular polarization at a plurality of selected locations on the plate. Electrode 46 may be a transparent or reflective conductive material depending on whether the transmitted ordinary light is sensed on the same side as the incident light is applied to the ceramic plate. The domain polarization may be locally switched as shown by the arrows by applying a positive voltage to electrode 48 and a negative voltage to electrode 46. The domain polarization may be erased or switched back to the initial uniform polarization positioning a generally flat, movable electrode 49 over the localized switched position or bit by reversing the voltage potentials.

Figure 5:
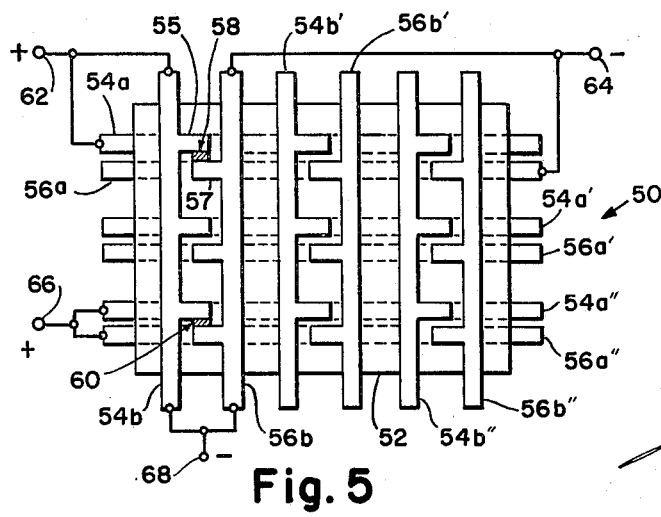
FIG. 5 is an elevational view of an electrode configuration of FIG. 3a arranged in a matrix array on a uniaxial ferroelectric element.

FIG. 5 illustrates a matrix electro-optical device 50 which may include any number of localized positions or areas which may be perpendicularly polarized, limited only by the fringe width. The device shown includes nine localized positions or bits distributed in a matrix array between the major surfaces of a hot pressed, optically uniaxial ferroelectric ceramic plate 52 having an initial uniform polarization either perpendicular or parallel to the major surfaces of the plate. For purposes of illustration it will be assumed that ceramic plate 52 is polarized as shown in FIG. 2a.

Each localized position or area may be defined by an electrode configuration similar to the electrodes in FIGS. 1, 3a and 4. The electrode configuration includes, on one major surface of ceramic plate 52, a plurality of generally parallel electrodes 54a, 54a' and 54a'' running the length of one dimension of ceramic plate 52 and alternating in pairs with a plurality of generally parallel electrodes 56a, 56a' and 56a''. The electrode configuration also includes, on the other major surface of ceramic plate 52, a plurality generally parallel electrodes 54b, 54b' and 54b'' alternating in pairs with a plurality of generally parallel electrodes 56b, 56b' and 56b'', all running perpendicular to the electrodes on the other major surface of ceramic plate 52. Each electrode 54b, 54b' and 54b'' includes a plurality of tabs or protrusions 55 extending from the electrode towards the corresponding parallel electrode 56b, 56b' and 56b'' while the latter electrodes includes a plurality of tabs 57 extending from the electrodes parallel to tabs 55. Each set of tabs 55 and 57 together with the corresponding parallel electrodes 54a and 56a define a localized position or bit such as the shaded areas designated as 58 and 60.

In order to perpendicularly switch a localized area 58 from the initial uniform polarization, electrodes 54a and 54b may be connected through a suitable electronic or logic switching circuit (not shown) to the positive terminal 62 of a voltage source (not shown). Electrodes 56a and 56b may be connected through a suitable switching circuit (not shown) to the negative terminal 64 of the voltage source (not shown). The resulting localized polarization may be the same as that shown in FIG. 3a.

Assuming that area 60 is already perpendicularly switched in the same manner as shown in FIG. 3a, the polarization may be switched back to its initial uniform polarization or erased by connecting electrodes 54a'' and 56a'' through a suitable switching circuit (not shown) to the positive terminal 66 of a voltage source (not shown) and by connecting electrodes 54b and 56b through a suitable switching circuit (not shown) to the negative terminal 68 of the voltage source (not shown).

The polarization of the localized areas defined by the various electrode configurations may be switched or erased by connecting the appropriate electrode pairs to the proper voltage polarity in a manner well known in the art. The switching may be accomplished by any suitable means such as the switching arrangement shown in FIG. 4.

Figure 6:
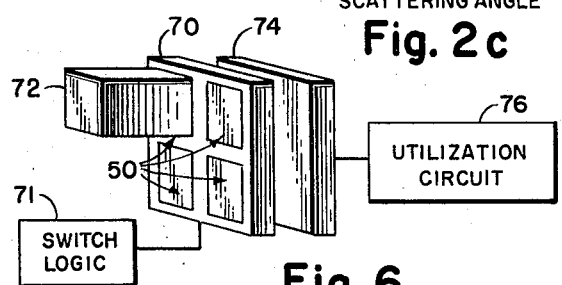
FIG. 6 is a diagrammatic view of an electro-optical system having the electrode matrix array of FIG. 5.

A plurality of matrices 50 may be arranged on a single optically uniaxial, ferroelectric ceramic plate 70 and connected to suitable switching and biasing logic circuit 71 as shown in FIG. 6. Each matrix may represent a binary word having a given number of bits which may be illuminated with a suitable word organized address light source 72 arranged opposite a major surface of ceramic plate 70. Light source 72 may be any suitable collimated light source such as a diode light source having collimator lenses. The transmitted light may be sensed by a photosensitive matrix array 74, such as a photodiode array, arranged opposite the other major surface of ceramic plate 70, wherein the photosensitive matrix array includes one sensor or photodiode for each localized position or area in each matrix 50. The photodiodes may be positioned to sense the conical beam of light shown in FIG. 2a and transmitted through its corresponding bit. The outputs of the photodiodes may be coupled to an appropriate utilization circuit 76 such as the logic or computing circuits in a digital computer.

The arrangements shown in FIGS. 5 and 6 provide a compact, high density storage or logic device which may have as many as $10^5$ to $10^6$ localized position or bits per square inch. Such arrangements, or the device shown in FIGS. 1, 3 and 4 may be used as solid state light shutters, optically interrogated computer memories having a permanent storage capability, display devices where the image is formed by switching the localized positions, and any number of optical logic circuits such as OR and AND circuits.

Light shutters may be constructed having widths (electrode separation) equal to or less than the plate thickness with no restrictions on lengths. A typical shutter having a 2 mil electrode separation and about .35 inch long may be switched in less than about 200 nanoseconds with about 170 ergs of switching energy. Using a high density matrix array, the localized positions may be switched in about 200 nanoseconds with about 0.5 ergs of switching energy.

It will be understood that various changes in the details, materials and arrangement of the parts, which have been herein described and illustrated in order to explain the nature of the invention, may be made by those skilled in the art.

What is claimed is:

1. An electrically variable light scattering device comprising; a hot-pressed, optically uniaxial, forroelectric ceramic plate having a multiplicity of domains and grains and grain size greater than about 2 microns; means for orienting domains at selected locations of said plate in parallelism in a first direction to achieve a first light scattering pattern; and means for switching said oriented domains in a second direction angularly disposed with respect to said first direction to achieve a second light scattering pattern to vary the opacity of said plate at said locations.

2. The device of claim 1 wherein said ferroelectric ceramic is hot pressed at a temperature from about 1100° C. to about 1400° C. for from about 0.5 to 16 hours at a pressure from about 1000 to about 10,000 p.s.i.

3. The device of claim 1 wherein said ferroelectric ceramic is a solid solution of lead zirconate and lead titanate in which the lead zirconate is present in the proportion of 65 mol perecent and the lead titanate is in the proportion of 35 mol percent, said composition also including about 2 atom percent bismuth oxide.

4. The device of claim 1 wherein said multiplicity of domains are initialy oriented in said second direction.

5. The device of claim 1 including means adjacent said plate for passing light through said plate at said locations.

6. The device of claim 5 including means for sensing the intensity of light transmitted through said plate at said locations.

7. The device of claim 1 wherein said orienting and switching means includes electrodes oppositely disposed at major surfaces of said plate and means for applying voltage potentials across said electrodes.

8. The device of claim 7 wherein said electrodes include a first electrode pair disposed at a major surface of said plate and a second electrode pair disposed at the other major surface of said plate opposite the first electrode pair.

9. The device of claim 8 having a plurality of electrode pairs disposed across said plate in a matrix array.

10. The device of claim 7 including a first electrode substantially covering a major surface of said plate and a second movable point electrode oppositely disposed from said first electrode.

References Cited

UNITED STATES PATENTS

| | | | |
|---|---|---|---|
| 3,027,806 | 4/1962 | Koelsch et al. | 350—150 |
| 3,083,262 | 3/1963 | Hanlet | 350—150 |
| 3,423,686 | 1/1969 | Ballman et al. | 350—150 |
| 2,928,075 | 3/1960 | Anderson | 350—150 |

DAVID SCHONBERG, Primary Examiner

P. R. MILLER, Assistant Examiner

U.S. Cl. X.R.

264—1; 350—147, 149, 150, 173.2